United States Patent [19]
Hanko et al.

[11] Patent Number: 5,649,093
[45] Date of Patent: Jul. 15, 1997

[54] SERVER DISK ERROR RECOVERY SYSTEM

[75] Inventors: James G. Hanko, Redwood City; Gerard A. Wall, San Jose, both of Calif.

[73] Assignee: Sun Microsystems, Inc., Mountain View, Calif.

[21] Appl. No.: 445,820

[22] Filed: May 22, 1995

[51] Int. Cl.⁶ .................................................. G06F 11/00
[52] U.S. Cl. .......................... 395/182.04; 395/185.07
[58] Field of Search .................... 395/182.04, 182.05, 395/182.03, 182.01, 185.01, 184.01, 185.07; 348/7

[56] References Cited

U.S. PATENT DOCUMENTS

| 5,072,378 | 12/1991 | Manka | 395/575 |
|---|---|---|---|
| 5,278,838 | 1/1994 | Ng et al. | 371/10.1 |
| 5,313,612 | 5/1994 | Satoh et al. | 395/425 |
| 5,351,246 | 9/1994 | Blaum et al. | 371/10.1 |
| 5,375,128 | 12/1994 | Menan et al. | 371/40.1 |
| 5,412,661 | 5/1995 | Had et al. | 371/10.1 |
| 5,442,390 | 8/1995 | Hooper et al. | 348/7 |
| 5,453,779 | 9/1995 | Dan et al. | 348/7 |
| 5,457,791 | 10/1995 | Matsamoto et al. | 395/182.03 |
| 5,461,415 | 10/1995 | Wolf et al. | 348/7 |
| 5,463,765 | 10/1995 | Kakuta et al. | 395/182.04 |
| 5,473,362 | 12/1995 | Fitzgerald et al. | 348/7 |

*Primary Examiner*—Robert W. Beausoliel, Jr.
*Assistant Examiner*—Norman M. Wright
*Attorney, Agent, or Firm*—Kang S. Lim

[57] ABSTRACT

The present invention provides a mass storage system suitable for incorporation in a video-on-demand server that is capable of detecting and correct errors without a substantial increase in processor capacity or memory buffer size, and without any increase in disk input/output (I/O) bandwidth. The mass storage system includes a server controller, a cluster of data disk drives and a parity drive associated with the cluster of data disk drives. The controller provides video data streams to a number of viewers. Data is stored as contiguous data strips in the cluster of data drives. Each data strip includes a plurality of contiguous data slices logically distributed across the cluster of data drives. A plurality of parity slices, each parity slice corresponding to each data strip, is stored in the parity drive. When the failure of one of the data drives is detected, the parity drive is read in place of the failed drive. Hence, all functional data drives are read along with the parity drive before the erroneous slice is needed. A replacement data slice is reconstructed from the parity slice and "good" data slices. Alternatively, the data drives of the mass storage system are partitioned into multiple sub-clusters of data drives to minimize the impact of a failed drive. Accordingly, the mass storage system includes multiple parity drives, each parity drive associated with a sub-cluster of data drives. Such an arrangement is useful because data reconstruction is limited to the data slices and parity slices of the affected sub-cluster.

22 Claims, 7 Drawing Sheets

|     | T1 | T2 | T3 | T4 | T5 | T6 | T7 | T8 | T9 | T10 | T11 | T12 | T13 | T14 | T15 | T16 | T17 |
|-----|----|----|----|----|----|----|----|----|----|-----|-----|-----|-----|-----|-----|-----|-----|
| D1  | R  | S  |    |    |    |    |    |    |    |     |     |     |     |     |     |     |     |
| D2  |    | R  | S  |    |    |    |    |    |    |     |     |     |     |     |     |     |     |
| D3  |    |    | R  | S  |    |    |    |    |    |     |     |     |     |     |     |     |     |
| D4  |    |    |    | R  | S  |    |    |    |    |     |     |     |     |     |     |     |     |
| P1  |    |    |    |    | R  | S  |    |    |    |     |     |     |     |     |     |     |     |
| D5  |    |    |    |    |    | R  | S  |    |    |     |     |     |     |     |     |     |     |
| D6  |    |    |    |    |    |    | R  | S  |    |     |     |     |     |     |     |     |     |
| D7  |    |    |    |    |    |    |    |    | S  | R   |     |     |     |     |     |     |     |
| D8  |    |    |    |    |    |    |    |    |    |     | S   | R   |     |     |     |     |     |
| P2  |    |    |    |    |    |    |    |    |    |     |     |     | S   | R   |     |     |     |

R – Read data from disk
S – Send data over the network

Time Slots

Disk Drives

FIG. 3A

Time Slots

| Disk Drives | T1 | T2 | T3 | T4 | T5 | T6 | T7 | T8 | T9 | T10 | T11 | T12 | T13 | T14 | T15 | T16 | T17 |
|---|---|---|---|---|---|---|---|---|---|---|---|---|---|---|---|---|---|
| D₁ | R | S | | | | | | | | | | | | | | | |
| D₂ | | R | S | | | | | | R | S | | | | | | | |
| D₃ | | | R | S | | | | | | R | S | | | | | | |
| D₄ | | | | R | S | | | | | | R | S | | | | | |
| P₁ | R | | | | | S | | | | | | R | | | | | |
| D₅ | | | | | ⊕ | | Ⓢ | S | | | | | ⊕ | S | | | |
| D₆ | | | R | | ⊕ | | | | R | | | | ⊕ | | Ⓢ | S | |
| D₇ | | | | R | ⊕ | | | | | | | R | ⊕ | | | | |
| D₈ | | | | | ⊕ | | | | S | R | | | ⊕ | | | | |
| P₂ | R | | | | ⊕ | | | | | R | | | ⊕ | | | | S |

⊕ — Perform XOR data reconstruction
Ⓢ — Send reconstructed replacement data over the network

FIG. 3B

SERVER DISK ERROR RECOVERY SYSTEM

BACKGROUND OF THE INVENTION

1. Related Application

Patent application entitled "Method and Apparatus for Guaranteeing Average Case Disk Transfer Bandwidth and Seek Time For a Video Server", (P755), U.S. patent application Ser. No. 08/446,144 by Jim Hanko and Steve Kleiman, assigned to Sun Microsystems, Inc., Mountain View, Calif., assignee of the present application is incorporated by reference herein. The above identified patent application is incorporated for the purpose of setting a stage for a discussion of the present invention and hence is not to be considered prior art nor an admission of prior art.

2. Field of the Invention

The present invention relates to the field of data storage and retrieval. More particularly, the invention relates to error detection and correction for mass storage systems.

3. Description of the Related Art

Conventional mass storage systems, e.g., banks of disk drives, have individual disk drive capacities approaching 2.0 giga-bytes of storage space and mean time between failures (MBTF) approaching thirty years. Unfortunately, the space demands of many consumer applications e.g. video servers, have also increased at a rapid rate and require an increasing number of disk drives per storage system. For example, even with data compression technology such as MPEG, a typical 120 minute full-length movie requires 3.6 giga-bytes of storage space. As a result, a video server with 15 full length movies will require a bank of thirty 2-giga-byte disk drives or its equivalent.

Statistically, a bank of thirty disk drives, assuming individual drive MBTF of thirty years, will have a system MTBF of about one year, i.e., one or more drives of the bank can be expected to fail after merely one year of continuous operation. As such, error detection/correction schemes have been developed to combat and compensate for reduced system MBTF due to the large number of disk drives in the bank. One such conventional scheme is the redundant array (of) inexpensive disks ("RAID") system.

FIG. 1 is a block diagram of a "pseudo RAID-4" video server 100 in which data is spread across (striped) data disk drives 111, 112, ... 119, with a parity disk drive 120 for storing error correcting information. As is well known in the art, a conventional high capacity disk drive, e.g, drive 111 has multiple platters $111a$, $111b$, $111c$, ... $111z$ and a corresponding number of read/write heads (not shown). These heads are operatively coupled so that they move together as part of a head assembly (not shown).

Historically, RAID was developed for "non-time-critical" user applications, e.g, as a network file server, where a second or two of time delay between a file request and the completion of a file retrieval is not critical to the application. Accordingly, data is distributed among cylinders of the disk drive in order to minimize movement of the disk drive's head assembly. A cylinder of a drive includes tracks of the platters accessible to the read/write heads of a head assembly without having to relocate the assembly. One such cylinder of disk drive 111 is represented by tracks $111a4$, $111b4$, $111c4$, ... $111z4$ of platters $111a$, $111b$, $111c$, ... $111z$, respectively. Data organization by cylinders maximizing the amount of data that can be retrieved before having to relocate the head assembly of a disk drive.

Naturally, in a typical RAID bank, parity is computed for corresponding cylinders of the bank of disk drives, i.e., data is stored in similar physical address locations (cylinders) of data disk drives while parity information is stored in the parity drive at a similar physical address location (cylinder). In this example, the data cylinder which includes tracks $111a4$, $111b4$, $111c4$, ... $111z4$, the data cylinder which includes tracks $112a4$, $112b4$, $112c4$, ... $112z4$, and the data cylinder which includes tracks $119a4$, $119b4$, $119c4$, ... $119z4$, correspond to the parity cylinder which includes tracks $120a4$, $120b4$, $120c4$, ... $120z4$.

Referring again to FIG. 1, RAID-based video server 100 is adapted for a conventional simplistic cable-TV system where each movie can be broadcasted by a network broadcaster 130 to multiple viewers 141, 142, ... 149, at a preset start and end time in accordance with a schedule determined in advance by the cable operator. For efficiency, each movie is stored in large blocks of contiguous data, with a single copy of each movie being shared among viewers 141, 142, ... 149. As a result, an individual viewer cannot select start and end times, and is forced to reschedule his/her other activities in order to be able to watch a movie.

However as viewers become more sophisticated and demanding, a viewer-friendly video-on-demand type system will become the norm. A video-on-demand system permits a video service subscriber, i.e., viewer, to select a movie at a viewer's own convenient start time. Unfortunately, attempting to adapt a RAID-based bank of disk drives for a "time-critical" application such as a video-on-demand server results in an inefficient system for the following reasons.

A video server based in the conventional RAID storage scheme tends to be inflexible with respect to start-times and selection of movies since the RAID optimization is based on storing large data blocks in cylinders of contiguous space. Further, since a minimal number of copies of each movie is stored (typically, one copy of each movie), only a limited number of viewers are able to simultaneous access the same movie.

Another disadvantage of the traditional RAID scheme is that multiple blocks of data are stored on the same cylinder of the disk drive. In the case of the innermost cylinder with the slowest access time, the viewer capacity of the video server is diminished during normal operation when there is no disk failure because viewer capacity is constrained by the worst case zone access time of the data drives.

Conversely, if data of a RAID-based server was distributed among cylinders of different zones and a disk failure occurs, a substantial amount of unnecessary data has to be read before data reconstruction can occur. This is because in addition to the normal read of the "good" drives, a read of large (logically unrelated but physically related) data blocks stored in the corresponding cylinders of the disk drives is also required. As a result, the server has to manage an excessive number of large data blocks which require large memory buffers for the data reconstruction. Consequently, when a disk failure occurs, either some viewers are dropped in order to service other viewers, or the number of viewers than can be serviced during normal operation is limited to the maximum number of viewers than can be serviced when there is a disk failure.

Hence, adapting the RAID error correction scheme to a video-on-demand system results in excessive reservation of processor and/or memory buffer capacity for real-time reconstruction of erroneous data. This is due primarily to the use of large inefficient data blocks instead of small efficient data slices ideal for the video-on-demand type system. This need for reserving processor and/or memory buffer capacity for error recovery becomes more acute as the number of movie selections and/or viewers increase.

Hence, there is a need for an error correction scheme for handling the small data slices optimized for a video-on-demand type server system, and capable of delivering "time-critical" data and real-time reconstruction of erroneous data without the need to reserve a substantial amount of processor capability or substantially increasing memory buffer requirements. Such a flexible video-on-demand server should have data distributed in small efficient slices of contiguous video information, striped across the bank of drives, so as to multiplex access to the same movie by interleaving access to the small data slices. Such a system should provide an illusion of simultaneous access to the same movie by the large number of viewers at each individual viewers' preferred start times.

SUMMARY OF THE INVENTION

The present invention provides a mass storage system suitable for incorporation in a video-on-demand server that is capable of detecting and correct errors without a substantial increase in processor capacity or memory buffer size, and without any increase in disk input/output (I/O) bandwidth. In addition, these goals are accomplished without introducing any undesirable constraints on the placement of data and parity information on the storage medium.

In one embodiment, the mass storage system includes a server controller, a cluster of data disk drives and a parity drive associated with the cluster of data disk drives. The controller provides video data streams to a number of viewers. Data is stored as contiguous data strips in the cluster of data drives. Each data strip includes a plurality of contiguous data slices logically distributed across the cluster of data drives. A plurality of parity slices, each parity slice corresponding to each data strip, is stored in the parity drive.

During normal operation, i.e., when all the data drives are functional, there is no need to read the parity drive. The data slices stored in the respective data drives are read as needed in a "just-in-time" (JIT) protocol. When the failure of one of the data drives is detected, the parity drive is read in place of the failed drive. Using a modified JIT protocol, all functional data drives are read along with the parity drive before the erroneous slice is needed. A replacement data slice is reconstructed from the parity slice and remaining data slices.

In another embodiment, the data drives of the mass storage system are partitioned into multiple sub-clusters of data drives to minimize the impact of a failed drive. Accordingly, the mass storage system includes multiple parity drives, each parity drive associated with a sub-cluster of data drives. Although counterintuitive, such an arrangement is advantageous because data reconstruction is limited to the data slices and parity slices of the affected sub-cluster, thereby reducing the need for reserve processor capacity and/or memory buffers used by server controller for data reconstruction. The use of multiple sub-clusters is feasible because the probability of a second disk drive failing before the first failed disk drive can be repaired is very low. Hence, instead of having to store data from every data drive, in this embodiment, buffers need only be large enough to store "good" slices from the affected sub-cluster. This dramatic reduction in reserve processor capacity over the prior art is accomplished with only a marginal increase in hardware, i.e., extra parity drive(s).

Note that the above-described embodiments, slice reads of "good" data drives advantageously provide double duty because each (necessarily executed) read of a good drive also provides data slices for viewers as well as data for reconstructing the erroneous data slices. In other words, there is no need to do extra reads of the "good" drive(s) for data reconstruction. Other advantages include the ability to scale up the server system without slowing down the server system.

DESCRIPTION OF THE DRAWINGS

The objects, features and advantages of the system of the present invention will be apparent from the following description in which:

FIGS. 3A and 3B are timing tables illustrating the reads and sends of data slices for the just-in-time scheduling protocols for the video servers of the present invention.

DESCRIPTION OF THE PREFERRED EMBODIMENT

In the following description, numerous details provide a thorough understanding of the invention. These details include functional blocks and exemplary mass storage devices to assist a system designer in implementing an efficient error correcting scheme for a "real-time" mass storage system. While the server system is illustrated by an implementation for a specific video-on-demand server, the principles of the invention are applicable to a wide variety of applications and environments. In other instances, well-known circuits, structures and program code are not described in detail so as not to obscure the invention unnecessarily.

Figure 1:
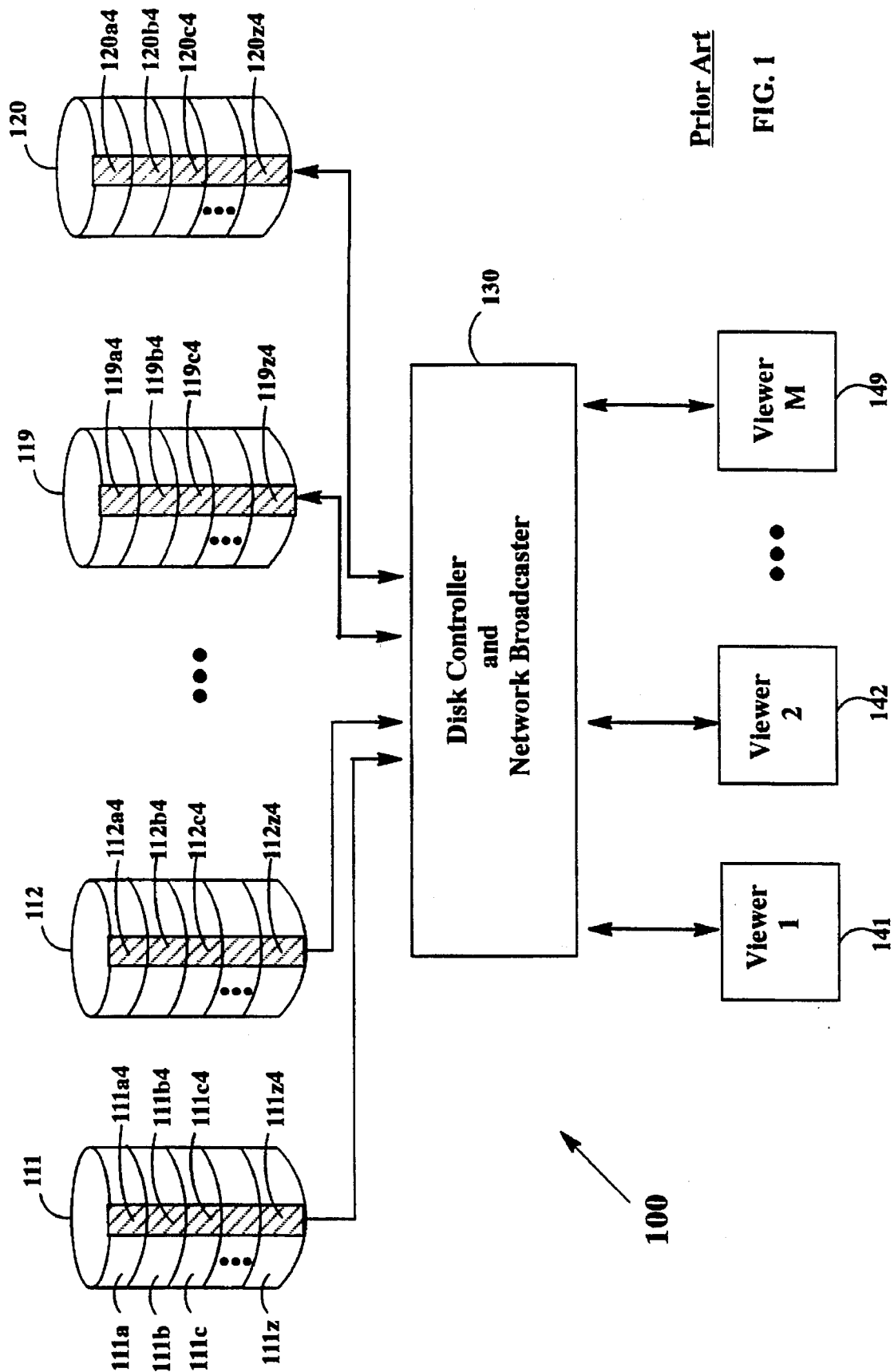
FIG. 1 is a block diagram of a RAID-based server.
Figure 2A:
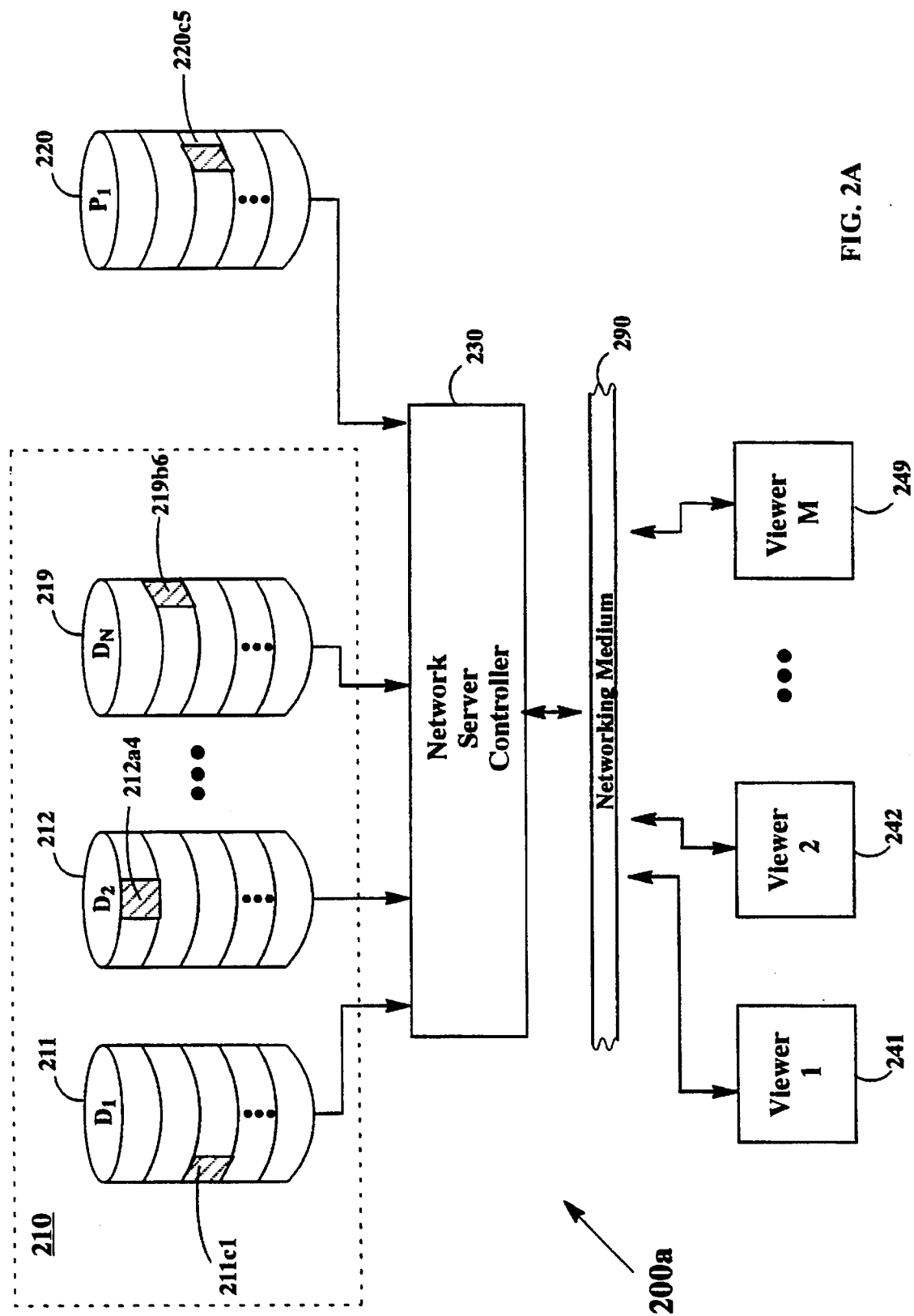
FIG. 2A illustrates a video-on-demand server which includes a cluster of data drives and a parity drive in accordance with the invention.

In one embodiment as shown in FIG. 2A, a video-on-demand server 200a includes a cluster 210 of data disk drives 211, 212, . . . 219 and parity disk drive 220 and a network to server controller 230. Data disk drives 211, 212, . . . 219 and parity disk drive 220 are coupled to server controller 230. In turn, controller 230 is coupled to and provides a video-on-demand service to a potentially large number of viewers 241, 242, . . . 249 via a networking medium 290.

Figure 2B:
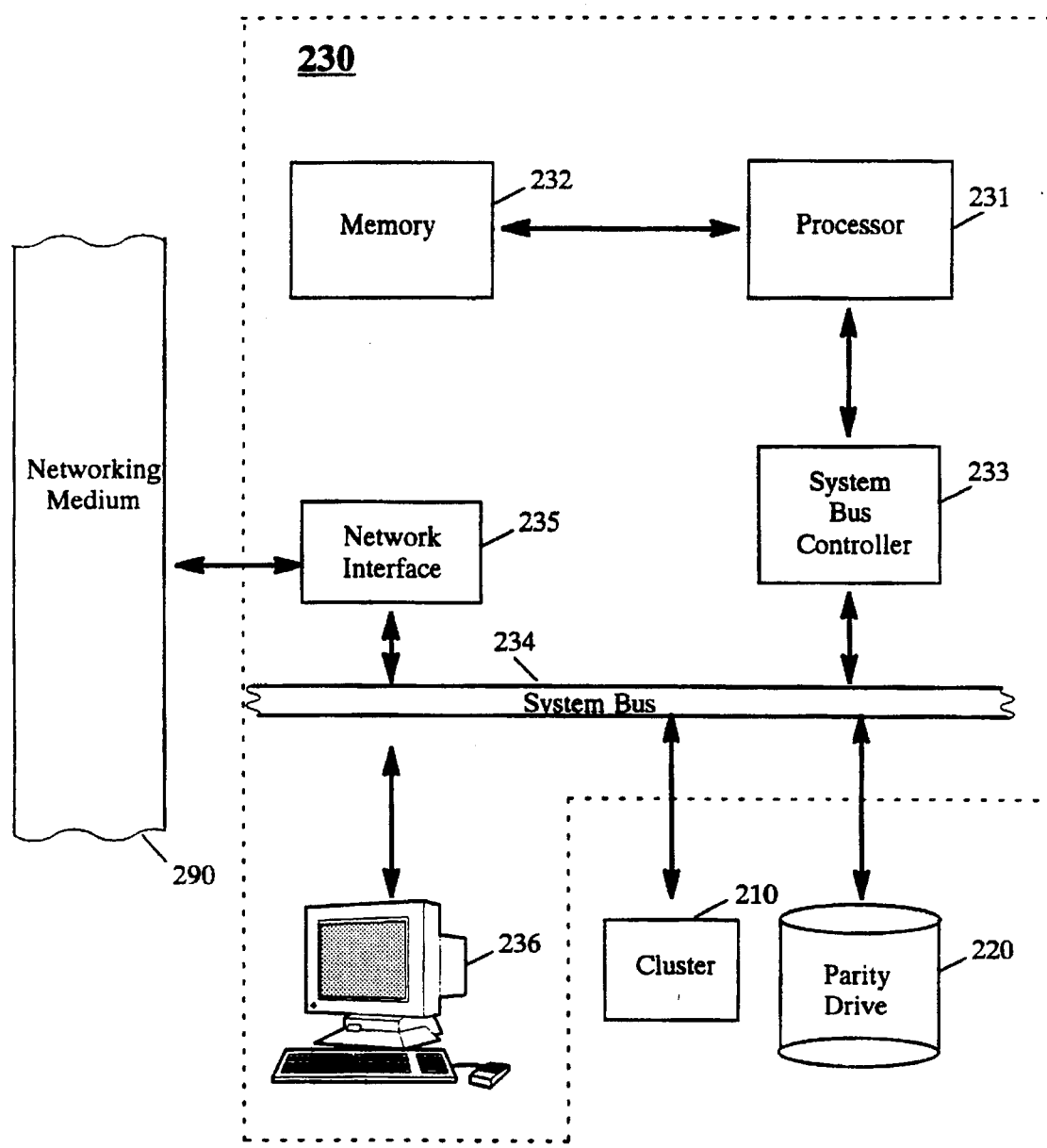
FIG. 2B is a detailed block diagram of a server controller for the server of FIG. 2A.

Server controller 230 can be a general purpose computer system executing video server software or a specialized computer system incorporating customized video server hardware and software. Referring to FIG. 2B, exemplary server controller 230 includes a processor 231, memory/buffers 232, a system bus controller 233, a system bus 234, a monitor/keyboard 236 and a networking interface 235 for communicating with the plurality of viewers 241, 242, . . . 249 over networking medium 290. Controller 230 is coupled to cluster 210 and parity drive 220 via system bus 234.

Video-on-demand server 200a permits viewers 241, 242, . . . 249 to independently select movies and select convenient start times while disregarding the request(s) of other viewers. Referring back to FIG. 2A, video server 200a accommodates this viewer flexibility by decomposing and distributing the content of each movie in small data slices, e.g, each slice may include 0.5 second of contiguous video information, striped across data drives 211, 212, . . . 219 of cluster 210, e.g., a strip which includes slices 211c1, 212a4, . . . 219b6. Consequently, a subset of viewers 241, 242, . . . 249 are able to view the same movie by interleaving access to the resulting small data slices, thereby providing an illusion of simultaneous access the same movie for a large subset of viewers 241, 242, . . . 249, at each individual viewers' preferred start times. In this embodiment, a data slice is between 64K bytes and 512K bytes in size, and is typically about 256K bytes in size.

In addition, slices are also evenly distributed over the innermost and outermost zones on each platter of data drives 211, 212, . . . 219, thereby ensuring that the average retrieval rate of data slices can be guaranteed over a short time period in a manner unnoticable by viewers 241, 242, . . . 249. As a result, the "worst case" average response time is the access rate of a slice located on an intermediate zone rather than that of a slice located on the slowest innermost zone of a platter. Copending patent application entitled "Method and Apparatus for Guaranteeing Average Case Disk Transfer Bandwidth and Seek Time For a Video Server" describes such a system. During normal operation, i.e, when all data drives 211, 212, . . . 219 of cluster 210 are functioning in an error-free manner, only data slices of cluster 210 need to be read, i.e., parity drive 220 is idle. A "just-in-time" (JIT) scheduling protocol is used by video server controller 230 for accessing cluster 210. Since the JIT protocol is also applicable to other embodiments of the invention, it is described in detail below after a detailed description of alternative embodiment(s). Other suitable scheduling protocols are also possible.

Parity drive 220 provides parity information which enables server 200a to provide data reconstruction for cluster 210 using server controller 230. For example, a parity slice 220c5 provides parity information corresponding to the data strip which includes slices 211c1, 212a4, . . . 219b6. Parity information is computed using a suitable method such as an "exclusive-OR" ("XOR") of the corresponding data slices.

As discussed above, a cluster of thirty drives can have a system MTBF of as low as one year. Hence, in the event the error detection circuitry of a data drive of cluster 110, e.g., drive 212, detects a disk drive failure, the error correction method of the present invention is practiced. When drive 212 fails, all data slices stored in drive 212, e.g. slice 212a4, are no longer dependable and have to be reconstructed.

Fortunately, data slices 211c1, . . . 219b6, and parity slice 220c5 required for reconstruction of erroneous slice 212a4 are each only 256K bytes in size. Consequently, retrieval of data slices 211c1, . . . 219b6, and parity slice 220c5 and reconstruction of erroneous data slice 212a4 can be completed in "real-time", without the need for excessive reserve processor capacity and/or memory buffers in server controller 230. A detailed description of a modified "just-in-time" protocol for data reconstruction is also provided after the description of the alternative embodiment(s).

Figure 2C:
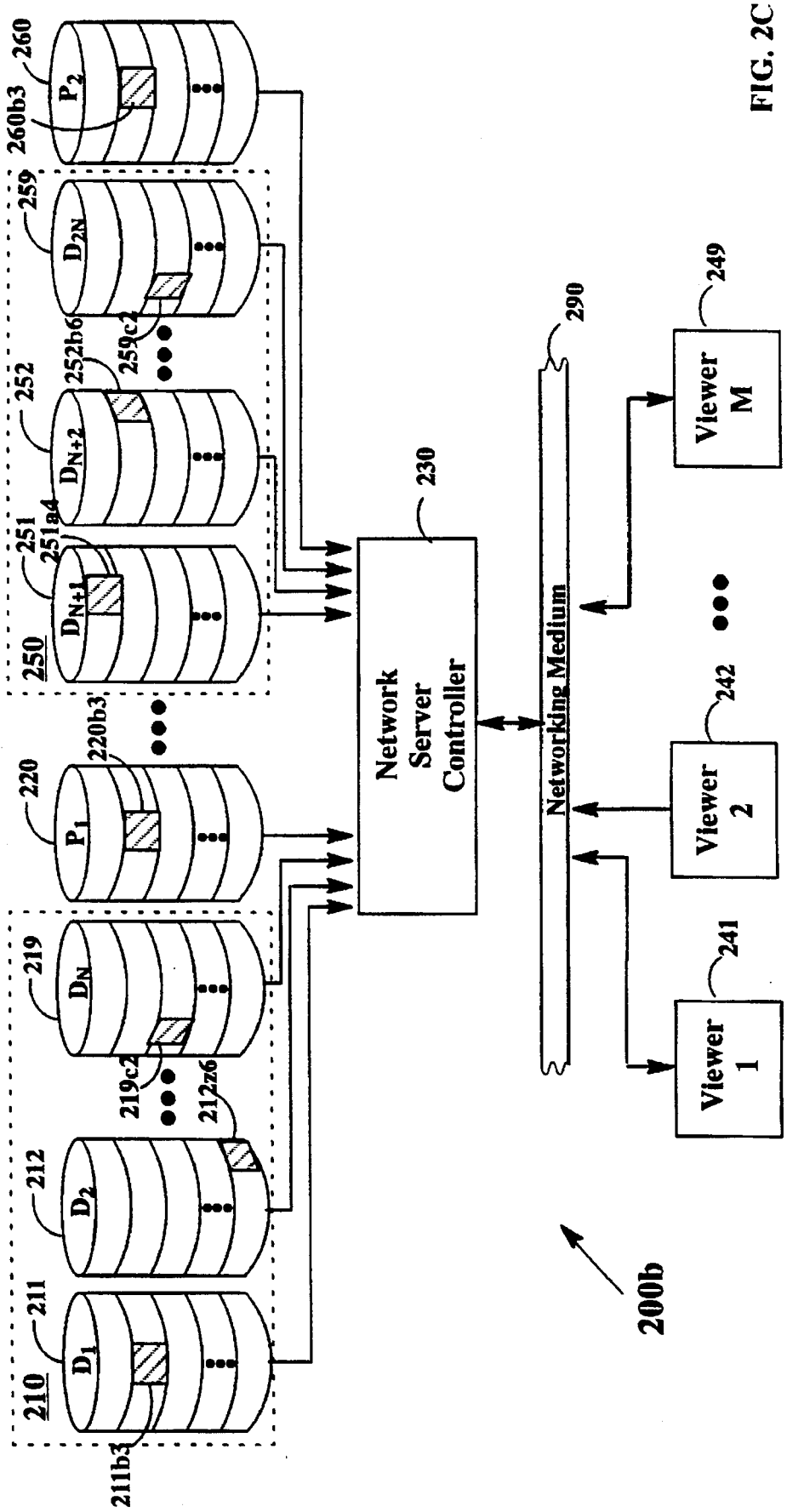
FIG. 2C is a block diagram of a multiple sub-cluster video-on-demand server of the invention.

In accordance with another embodiment of the invention as illustrated by FIG. 2C, although counterintuitive on its face, the data drives of video-on-demand server 200b are partitioned into multiple sub-clusters, e.g., sub-clusters 210, 250. In addition, server 200b include parity drives 220, 260 which are dedicated to sub-clusters 210, 250, respectively. In this example, the first sub-cluster 210 includes data drives 211, 212, . . . 219, and the second sub-cluster 250 includes data drives 251, 252, . . . 259. Sub-clusters 210, 250 and parity drives 220, 260 are coupled to a network server controller 230. In turn, controller 230 provides independent video streams for a plurality of viewers 241, 242, . . . 249 via networking medium 290.

Partitioning the data drives of server 200b into two or more sub-clusters, e.g., sub-clusters 210, 250, is a cost-effective arrangement because when a single data drive, e.g., data drive 252, fails, server controller 230 only has to reconstruct data slices for the single failed data drive 252 of the affected sub-cluster 250. The use of multiple sub-clusters 210, 250 is feasible because, with the MTBF of commercially available disk drives, the probability of a second disk drive failing before a first failed disk drive can be repaired, e.g., eight hours or one work day, is very low. Such an arrangement further reduces the need for reserve processor capacity and memory buffers for data reconstruction by localizing the impact of a failed data drive to affected sub-cluster 250. Hence, instead of having to store data and parity slices from every data and parity drive of server 200b, data buffers of memory 232 need only be large enough to store slices from affected sub-cluster 250.

FIGS. 3A and 3B are timing tables illustrating the reads and sends of data slices for the JIT scheduling protocols implemented on multiple sub-cluster server system 200b of FIG. 2C. FIG. 3A shows the interleaved read and send pairs when all data drives of both sub-clusters 210, 250 are functional, while FIG. 3B illustrates the read and writes of sub-clusters 210, 250 when data drive D6 is not functional. In this example, the number of data drives per sub-cluster N is equal to four. As discussed above, the principles for reconstructing erroneous data slices of a failed disk drive are applicable to both multiple sub-cluster systems such as server 200b and single cluster systems such as server 200a.

Referring first to FIG. 3A, pairs of reads ("R") and sends ("S") of the each data drive are interleaved so that when a data drive a sub-cluster is sending a slice to controller 230, the next data drive of the sub-cluster is reading the next consecutive slice. For example, during time slot T1, data drive D1 is reading. During time slot T2, while data drive D1 is sending a slice to controller 230, data drive D2 is reading the next slice.

Similarly, the send of the last data drive of a sub-cluster overlaps the read of the first data drive of the next sub-cluster. In this example, the send of data drive D4 of sub-cluster 210 overlaps the read of data drive D5 of sub-cluster 250 during time slot T5.

Finally, the send of the last data drive of the last sub-cluster in the bank overlaps the read of the first data drive of the first sub-cluster. For example, during time slot T9, data drive D8 is sending while data drive D1 is reading. Note that parity drives 220, 260 are not read during normal operation of server 200b, i.e., when all data drives are functional. In this example, controller 230 can achieve a "real time" retrieval rate of one data slice per time slot while accessing at most one data drive at any time slot.

Referring now to the timing table of FIG. 3B, first sub-cluster 210 is fully functional while data drive D6 of second sub-cluster 250 has failed. Reads and sends of fully functional sub-cluster 210 are as described in the example above for FIG. 3A, when both sub-clusters 210, 250 are fully functional.

In accordance with the invention, when a sub-cluster has one failed data drive, the time slot prior to the first scheduled send of the first data drive of the sub-cluster is allocated for data reconstruction. Consequently, reads of all functional data drives and the parity drive must be completed prior to the data reconstruction time slot. This description is illustrative of the operation of server 200b with one active data stream. When server 200b is operating at full load, each drive will be similarly busy in each time slot serving other sets of viewers.

Figure 4:
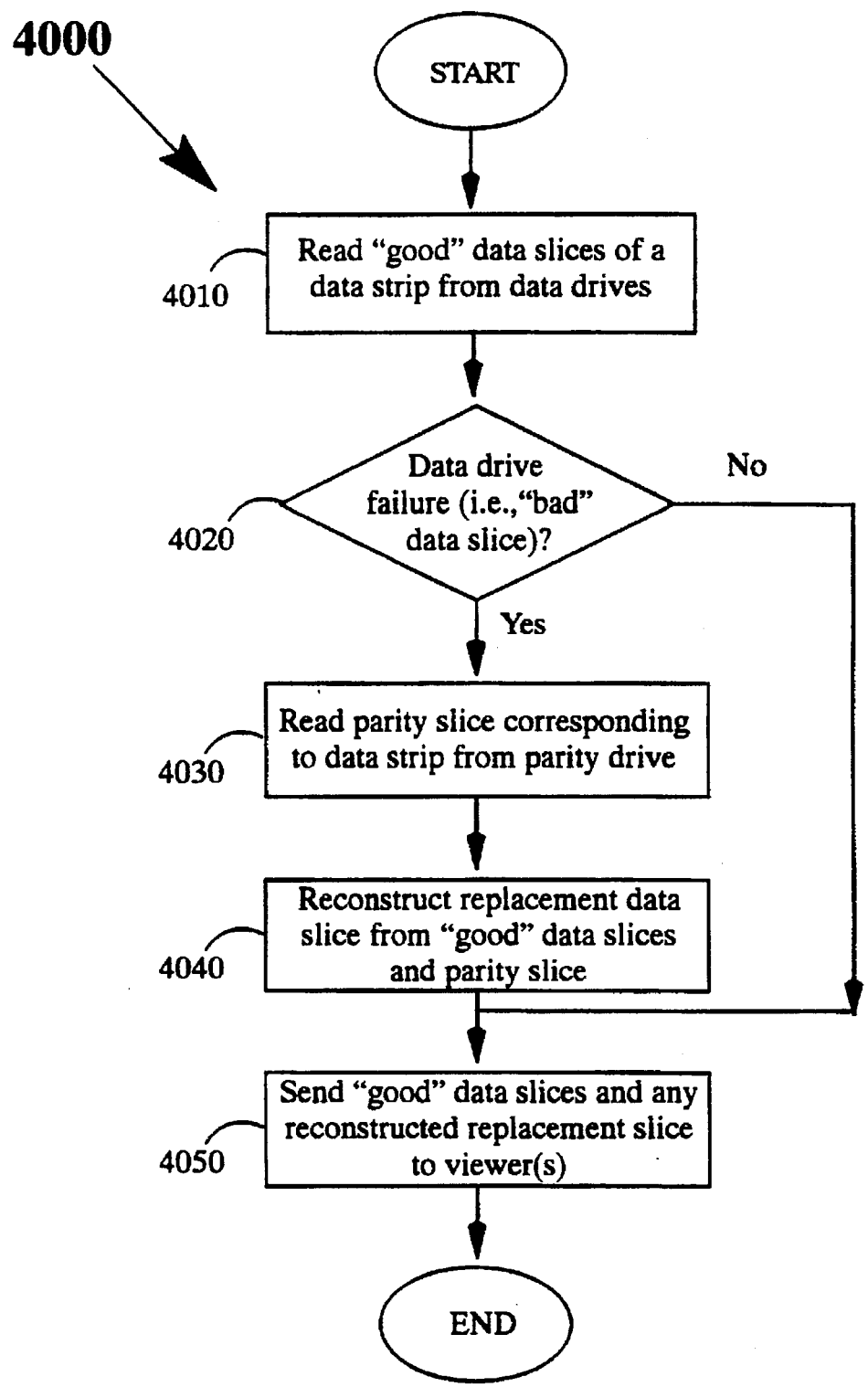
FIG. 4 is a flowchart illustrating the video servers of the invention.

Referring to the flowchart 4000 of FIG. 4 and also to the specific example illustrated by the timing table of FIG. 3B, data drive D6 of sub-cluster 250 is the failed data drive. In this example, time slot T5 is reserved for data reconstruction in order to accommodate the worst case scenario when data drive D5 is the failed drive. A failure of data drive D5 is the worst case for sub-cluster 250 because data drive D5 is the first drive expected to send a slice, i.e., in time slot T6.

In order to be able to send a reconstructed slice in place of the erroneous data slice drive in time slot T6, all reads of functional data drives D5, D7, D8 and parity drive P2 must be completed before time slot T5. Accordingly, reads of "good" data drives D5, D7, D8 occur in time slots T1, T3, T4, respectively (step 4010). Since data drive D6 has failed (4020), parity drive P2 is read in time slot T2 (4030). Note that the read of parity drive P2 takes the place of data drive D6 and so the overall load of the required disk reads on processor 231 remain the same. Although the reads of drives D5, D7, DS, P2 are shown in an exemplary order, within that order, other permutations are possible. For example, parity drive P2 can be read last (step 4030), i.e., drives D7, D5, D8, P2 are read in time slots T1, T2, T3, T4, respectively. Subsequently, data reconstruction ("⊕") of the replacement data slice for data drive D6 occurs in time slot T5 (step 4040). Server 200b can now send all the good data slices in time slots T6, T8, T9 and any reconstructed replacement slice (on schedule) in time slot T7, thereby providing uninterrupted service to a subset of viewers 241, 242, . . . 249 (step 4050).

In some embodiments, sub-clusters 210, 250 share the same disk controller circuitry. Alternatively, sub-clusters 210, 250 may have dedicated disk controller circuitry to lessen impact of having to execute two simultaneous reads within each time slot, e.g, data drives D1 and D5.

Hence, using the JIT protocols of the above described embodiments, slice reads of "good" data drives advantageously provide double duty because each read of a good drive (normally performed) provides data slices from the good drives as well as data for reconstructing the erroneous data slices from the failed drive. In other words, there is no need to do extra reads of the "good" drive prior to the reconstruction. As a result, even after one drive has failed, the overall access frequency of sub-clusters 210, 250 and parity drives 220, 260 remain at the same level while maintaining the "real time" video stream(s) to viewers 241, 242, . . . 249.

Other modifications and additions are possible without departing from the spirit of the invention. For example, server 200 may include other mass storage mediums, including optical drives or other non-rotating mass storage mediums. Hence, the scope of the invention should be determined by the following claims.

What is claimed is:

1. A method of detecting and correcting errors in a mass storage system including a processor, a cluster of data drives and a parity drive, wherein data is stored as a plurality of data strips in said cluster of data drives, each said data strip including a plurality of contiguous data slices logically distributed across said cluster of data drives, and wherein a plurality of parity slices, each parity slice corresponding to each said data strip, are stored in said parity drive, the method including the steps of:

retrieving one said data strip from sad cluster of data drives;

detecting a data drive failure affecting an erroneous one of said data slices of said one data strip;

retrieving one of said parity slices corresponding to said one data strip from said parity drive;

reconstructing a corrected data slice from said one data strip and said one parity slice, said corrected data slice for replacing said one erroneous data slice; and wherein said data slices of said one data strip have been distributed among different zones of said data drives so that the average retrieval rate of said data slices approximates the access rate associated with intermediate, zone of said data drives.

2. The method of claim 1 wherein said mass storage system is a video-on-demand server and said data is an encoded video stream.

3. The method of claim 1 wherein said data and parity drives are magnetic or optical drives.

4. The method of claim 1 wherein each of said data drives has an innermost zone and an outermost zone, said data slices are evenly distributed over said respective innermost zones and said respective outermost zones of said data drives, and the location of said parity slice on said parity drive is independent of the location of said data slices on said data drives.

5. The method of claim 1 wherein the step of retrieving said data strip is in accordance with a "just-in-time" scheduling protocol.

6. The method of claim 1 further comprising the step of partitioning said cluster of data drives into multiple subclusters of data drives, each said sub-cluster associated with a parity drive.

7. A method of detecting and correcting errors in a mass storage system including a processor, at least two clusters of data drives and a corresponding number of parity drives, wherein data is stared as a plurality of data strips in said cluster of data drives, each said data strip including a plurality of contiguous data slices logically distributed across one said cluster of data drives, and wherein a plurality of parity slices, each parity slice corresponding to each said data strip, are stored in one said parity drive, the method including the steps of:

retrieving one said data strip from said one cluster of data drives;

detecting a data drive failure affecting an erroneous one of said data slices of said one data strip;

detecting a data drive failure affecting an erroneous one of said data slices of said on data strip;

retrieving one of said parity slices corresponding to said one data strip from said parity drive;

reconstructing a corrected data slice from said one data strip and said one parity slice, said corrected data slice for replacing said one erroneous data slice; and wherein said data slices of said one data strip have been distributed among different zones of said data drives so that the average retrieval rate of said data slices approximates the access rate associated with an intermediate zone of said data drives.

8. The method of claim 7 wherein said mass storage system is a video-on-demand server and said data is an encoded video stream.

9. The method of claim 7 wherein said data and parity drives are magnetic or optical drives.

10. The method of claim 7 wherein each of said data drives has an innermost zone and an outermost zone, said data slices are evenly distributed over said respective innermost zones an said respective outermost zones of said data drives, and the location of said parity slice on said parity drive is independent of the location of said data slices on said data drives.

11. The method of claim 7 wherein the step of retrieving said data strip is in accordance with a "just-in-time" scheduling protocol.

12. A mass storage system useful in association with a video-on-demand server having a controller coupled to a plurality of viewers, said mass storage system comprising:

a cluster of data drives for storing a plurality of data strips, each said data strip including a plurality of contiguous data slices logically distributed across said cluster of data drives by distributing said data slices of said one data strip among different zones of said data drives so that the average retrieval rate of said data slices approximates the access rate associated with an intermediate zone of said cluster of data drives; and a parity drive for storing a plurality of parity slices, each parity slice corresponding to each said data strip, and wherein said data strips and parity slices are useful for reconstructing replacement data slices.

13. The storage system of claim 12 wherein said data strips include an encoded video stream.

14. The storage system of claim 12 wherein said data and parity drives are magnetic or optical drives.

15. The storage system of claim 12 wherein each of said data drives has an innermost zone and an outermost zone, said data slices are distributed over said respective innermost zones and said respective outermost zones of said data drives, and the location of said parity slice on said parity drive is independent of the location of said data slices on said data drives.

16. The storage system of claim 12 wherein said cluster of data drives is partitioned into multiple sub-clusters of data drives, said storage system further comprising of a plurality of parity drives, each parity drive associated with each said sub-cluster.

17. A mass storage system useful in association with a video server having a controller coupled to a plurality of viewers, said mass storage system comprising:

a plurality of sub-clusters of data drives for storing a plurality of data strips, each said data strip including a plurality of contiguous data slices logically distributed across one said cluster of data drives by distributing said data slices of said one data strip among different zones of said data drives so that the average retrieval rate of said data slices approximates the access rate associated with an intermediate zone of said cluster of data drives; and a corresponding plurality of parity drives for storing a plurality of parity slices, each parity slice corresponding to each said data strip, and wherein said data strips and parity slices are useful for reconstructing replacement data slices.

18. The storage system of claim 17 wherein said data strips include an encoded video stream.

19. The storage system of claim 17 wherein said data and parity drives are magnetic or optical drives.

20. The storage system of claim 17 wherein each of said data drives has an innermost zone and an outermost zone, said data slices are evenly distributed over said respective innermost zones and said respective outermost zones of said data drives, and the location of said parity slice on said parity drive is independent of the location of said data slices on said data drives.

21. A method of detecting and correcting errors in a mass storage system including a processor, a cluster of data drives and a parity drive, wherein data is stored as a plurality of data strips in said cluster of data drives, each said data strip including a plurality of contiguous data slices, the method including the steps of:

storing one said data strip in said cluster of data drives by distributing said data slices of said one data strip among different zones of said data drives so that the average retrieval rate of said data slices approximates the access rate associated with an intermediate zone of said cluster of data drives; and storing a parity slice corresponding to said one data strip in said parity drive.

22. The method of claim 21 wherein each of said data drives has an innermost zone and an outermost zone, said data slices are evenly distributed over said respective innermost zones and said respective outermost zones of said data drives, and the location of said parity slice on said parity drive is independent of the location of said data slices on said data drives.

* * * * *